(12) United States Patent
Tsai, Jr. et al.

(10) Patent No.: US 11,667,349 B2
(45) Date of Patent: Jun. 6, 2023

(54) BICYCLE REAR DERAILLEUR

(71) Applicant: TEKTRO TECHNOLOGY CORPORATION, Changhua County (TW)

(72) Inventors: Szu-Fang Tsai, Jr., Changhua County (TW); Bo-Yi Liao, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 57 days.

(21) Appl. No.: 17/330,538

(22) Filed: May 26, 2021

(65) Prior Publication Data

US 2021/0371047 A1 Dec. 2, 2021

(30) Foreign Application Priority Data

May 29, 2020 (TW) ................................. 109118130

(51) Int. Cl.
*B62M 9/125* (2010.01)
*B62M 9/126* (2010.01)

(52) U.S. Cl.
CPC ............ *B62M 9/125* (2013.01); *B62M 9/126* (2013.01)

(58) Field of Classification Search
CPC .... B62M 9/121; B62M 9/124; B62M 9/1242; B62M 9/1244; B62M 9/1248; B62M 9/125; B62M 9/126; B62M 2009/12406; B62M 2009/12413; B62M 9/135; B62M 9/136

See application file for complete search history.

(56) References Cited

U.S. PATENT DOCUMENTS

| | | | | |
|---|---|---|---|---|
| 3,111,855 A | * | 11/1963 | Juy ........................ | B62M 9/126 474/82 |
| 4,637,809 A | * | 1/1987 | Nagano ................ | B62M 9/1248 474/82 |
| 4,690,663 A | * | 9/1987 | Nagano .................. | B62M 9/125 474/80 |
| 5,358,451 A | * | 10/1994 | Lacombe ............... | B62M 9/124 474/78 |
| 5,498,211 A | * | 3/1996 | Hsu ...................... | B62M 9/1248 74/473.13 |
| 5,836,844 A | * | 11/1998 | Yoshida ................. | B62M 9/125 411/539 |

(Continued)

FOREIGN PATENT DOCUMENTS

FR 2699137 A1 * 6/1994 .......... B62M 9/1244

*Primary Examiner* — Michael R Mansen
*Assistant Examiner* — Raveen J Dias
(74) *Attorney, Agent, or Firm* — Locke Lord LLP; Tim Tingkang Xia, Esq.

(57) ABSTRACT

A bicycle rear derailleur includes a seat assembly, a movable component, a linkage assembly, and a chain guide. The seat assembly includes a first seat body, a second seat body, and a shaft. The shaft is disposed through the first seat body and the second seat body and configured to be mounted on the bicycle frame, and the second seat body is configured to connect the first seat body with the bicycle frame. The linkage assembly connects the movable component with the first seat body. The chain guide is pivotably disposed on the movable component. The first seat body is movable towards or away from the second seat body along a central line of the shaft.

20 Claims, 9 Drawing Sheets

(56) References Cited

U.S. PATENT DOCUMENTS

| | | | | |
|---|---|---|---|---|
| 5,961,409 A * | 10/1999 | Ando | B62M 9/1244 | 474/82 |
| 6,350,212 B1 * | 2/2002 | Campagnolo | B62M 9/126 | 474/82 |
| 7,090,603 B2 * | 8/2006 | Shahana | B62M 9/125 | 474/80 |
| 7,166,048 B2 * | 1/2007 | Shahana | B62J 23/00 | 474/82 |
| 7,189,172 B2 * | 3/2007 | Shahana | B62M 9/125 | 474/80 |
| 7,396,304 B2 * | 7/2008 | Shahana | B62M 9/125 | 474/82 |
| 7,572,199 B1 * | 8/2009 | Calendrille, Jr. | B62M 9/125 | 474/82 |
| 7,585,237 B2 * | 9/2009 | Fukuda | B62M 9/125 | 411/383 |
| 7,614,972 B2 * | 11/2009 | Oseto | B62M 9/1244 | 474/82 |
| 7,905,804 B2 * | 3/2011 | Yamaguchi | B62M 9/125 | 474/80 |
| 7,963,870 B2 * | 6/2011 | Deguchi | B62M 9/125 | 474/82 |
| 8,142,312 B2 * | 3/2012 | Watarai | B62M 9/125 | 474/80 |
| 8,419,573 B2 * | 4/2013 | Yamaguchi | B62M 9/127 | 267/155 |
| 9,334,016 B2 * | 5/2016 | Shahana | B62M 9/121 | |
| 10,464,634 B2 * | 11/2019 | Ueda | B62M 9/1248 | |
| 10,870,464 B2 * | 12/2020 | Braedt | B62M 9/125 | |
| 11,230,350 B2 * | 1/2022 | Braedt | B62M 9/125 | |
| 11,364,972 B2 * | 6/2022 | Chiang | B62M 9/125 | |
| 2004/0110586 A1 * | 6/2004 | Shahana | B62J 23/00 | 474/80 |
| 2004/0110587 A1 * | 6/2004 | Shahana | B62J 23/00 | 474/82 |
| 2004/0116222 A1 * | 6/2004 | Shahana | B62M 9/125 | 474/82 |
| 2006/0058135 A1 * | 3/2006 | Shahana | B62M 9/125 | 474/82 |
| 2006/0105869 A1 * | 5/2006 | Fukuda | B62M 9/125 | 474/82 |
| 2006/0194660 A1 * | 8/2006 | Shahana | B62M 9/12 | 474/82 |
| 2007/0026985 A1 * | 2/2007 | Yamaguchi | B62M 9/126 | 474/82 |
| 2007/0173360 A1 * | 7/2007 | Shahana | B62M 9/1242 | 474/82 |
| 2008/0026890 A1 * | 1/2008 | Oseto | B62M 9/1242 | 474/82 |
| 2008/0026891 A1 * | 1/2008 | Oseto | B62M 9/1242 | 474/82 |
| 2008/0051237 A1 * | 2/2008 | Shahana | B62M 9/1244 | 474/82 |
| 2008/0064544 A1 * | 3/2008 | Yamaguchi | B62M 9/125 | 474/82 |
| 2008/0125258 A1 * | 5/2008 | Oseto | B62M 9/1244 | 474/80 |
| 2009/0275429 A1 * | 11/2009 | Deguchi | B62M 9/125 | 474/80 |
| 2010/0004079 A1 * | 1/2010 | Watarai | B62M 9/125 | 474/135 |
| 2014/0018199 A1 * | 1/2014 | Shahana | B62M 9/126 | 474/82 |
| 2018/0265169 A1 * | 9/2018 | Braedt | B62M 9/128 | |
| 2019/0016411 A1 * | 1/2019 | Ueda | B62M 9/135 | |
| 2019/0322333 A1 * | 10/2019 | Braedt | B62M 9/125 | |
| 2020/0255090 A1 * | 8/2020 | Chiang | B62M 9/125 | |
| 2020/0298933 A1 * | 9/2020 | Braedt | B62M 9/1242 | |
| 2021/0070395 A1 * | 3/2021 | Braedt | B62M 9/1242 | |
| 2022/0177075 A1 * | 6/2022 | Braedt | B62M 9/125 | |

* cited by examiner

BICYCLE REAR DERAILLEUR

CROSS-REFERENCE TO RELATED APPLICATIONS

This non-provisional application claims priority under 35 U.S.C. § 119(a) on Patent Application No(s). 109118130 filed in Taiwan, R.O.C on May 29, 2020, the entire contents of which are hereby incorporated by reference.

TECHNICAL FIELD

The disclosure relates to a rear derailleur, more particularly to a bicycle rear derailleur.

BACKGROUND

A bicycle may have a front derailleur, a rear derailleur, or both to move the chain among the front chainrings and sprockets of a rear cassette in order to get the user a comfy gear ratio.

The rear derailleur generally is disposed on the bicycle frame. But the rear derailleur sometimes does not perfectly fit the bicycle frame since the existing bicycle frames have a significant difference in thickness, which may cause the chain guide of the rear derailleur to misalign with the sprockets and thus adversely affecting the adjustment of the bicycle chain. Some will put one or more gaskets between the rear derailleur and the bicycle frame in order to adjust the position of the chain guide, but the placement of the gasket requires the detaching and installation of the rear derailleur, leading to a troublesome and inconvenient process.

Also, the gasket the user can get might not be able to exactly allow the chain guide to be aligned with the sprocket, that is, adding gasket is not an effective solution to align the chain guide with the sprocket.

SUMMARY OF THE INVENTION

The disclosure provides a bicycle rear derailleur that enables an efficient and effective alignment of its chain guide.

One embodiment of the disclosure provides a bicycle rear derailleur. The bicycle rear derailleur is configured to be mounted on a bicycle frame. The bicycle rear derailleur includes a seat assembly, a movable component, a linkage assembly, and a chain guide. The seat assembly includes a first seat body, a second seat body, and a shaft. The shaft is disposed through the first seat body and the second seat body and configured to be mounted on the bicycle frame, and the second seat body is configured to connect the first seat body with the bicycle frame. The linkage assembly connects the movable component with the first seat body. The chain guide is pivotably disposed on the movable component. The first seat body is movable towards or away from the second seat body along a central line of the shaft.

Another embodiment of the disclosure provides a bicycle rear derailleur. The bicycle rear derailleur is configured to be mounted on a bicycle frame. The bicycle rear derailleur includes a seat assembly, an adjustment component, a movable component, a linkage assembly, and a chain guide. The seat assembly includes a first seat body and a shaft. The shaft is disposed through the first seat body and configured to be mounted on the bicycle frame. The adjustment component is disposed on the first seat body. The adjustment component is rotatable relative to the first seat body to move the first seat body relative to the shaft along a central line of the shaft. The linkage assembly connects the movable component with the first seat body. The chain guide is pivotably disposed on the movable component.

Still another embodiment of the disclosure provides a bicycle rear derailleur. The bicycle rear derailleur is configured to be mounted on a bicycle frame. The bicycle rear derailleur includes a seat assembly, an adjustment component, a movable component, a linkage assembly, and a chain guide. The seat assembly includes a first seat body and a shaft. The shaft is disposed through the first seat body and configured to be mounted on the bicycle frame. The adjustment component is disposed on the first seat body. The adjustment component is rotatable relative to the first seat body to move the first seat body towards or away from the bicycle frame along a central line of the shaft. The linkage assembly connects the movable component with the first seat body. The chain guide is pivotably disposed on the movable component.

According to the bicycle rear derailleur as discussed in the above embodiments, the first seat body is movable towards or away from the second seat body or the bicycle frame along the central line of the shaft, such that the position of the first seat body and the chain guide thereon can be adjusted. Therefore, the chain guide can be moved to align with the sprocket without detaching the bicycle rear derailleur or the need of any gasket. Accordingly, the bicycle rear derailleur achieves an effortless and convenient position adjustment of chain guide.

In addition, the position of the chain guide can be finely adjusted by moving the first seat body towards or away from the second seat body or the bicycle frame along the central line of the shaft, thus the bicycle rear derailleur is able to achieve a high accuracy alignment of the chain guide with the sprocket of the cassette.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
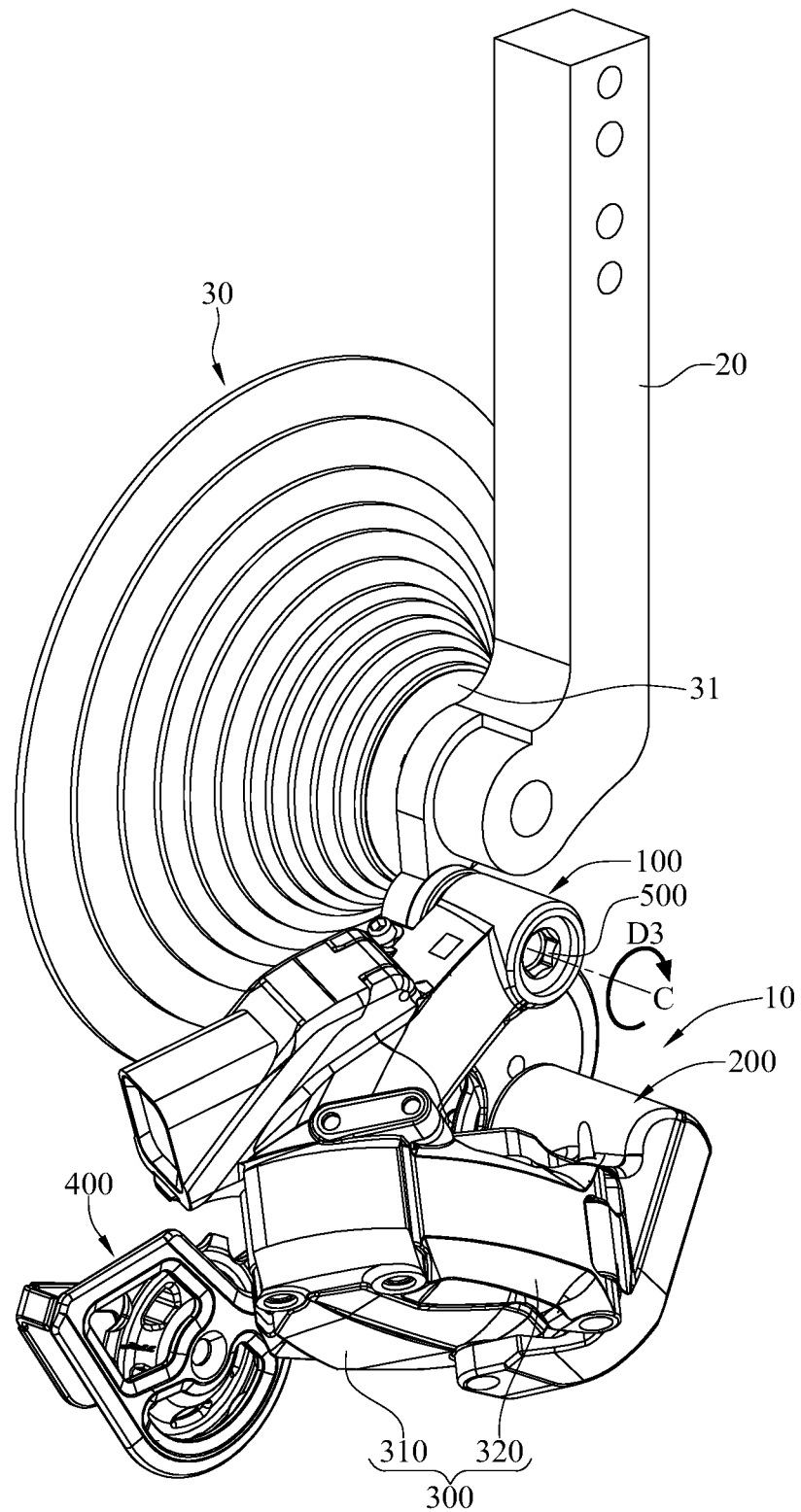
FIG. 1 is a perspective view of a bicycle rear derailleur according to a first embodiment of the disclosure, a bicycle frame, and a cassette.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
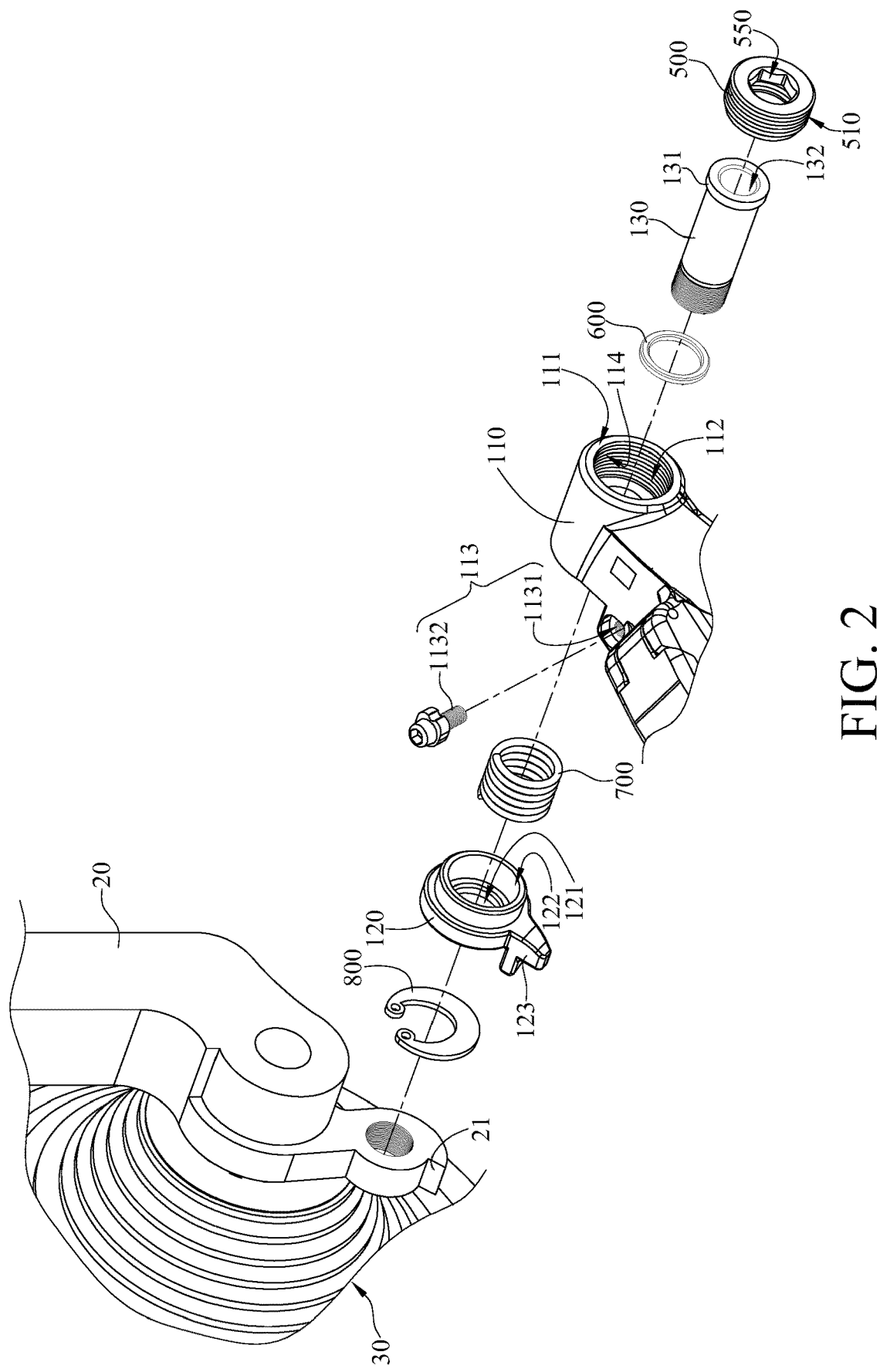
FIG. 2 is a partial exploded view of the bicycle rear derailleur, the bicycle frame, and the cassette in FIG. 1.

Referring to FIGS. 1 and 2, there are shown a perspective view and a partial exploded view of a bicycle rear derailleur 10 according to a first embodiment of the disclosure. As shown, the bicycle rear derailleur 10 is adapted to a bicycle frame 20 and a cassette 30.

In this embodiment, the bicycle rear derailleur 10 may be mounted on the bicycle frame 20 and is configured to move a chain (not shown) over sprockets of the cassette 30. The bicycle rear derailleur 10 is, for example, an electronic derailleur, but the disclosure is not limited thereto; in some other embodiments, the bicycle rear derailleur may be a mechanical derailleur. As shown, the reference number 31 denotes the smallest sprocket of the cassette 30.

The bicycle rear derailleur 10 includes a seat assembly 100, a movable component 200, a linkage assembly 300, and a chain guide 400. In this or another embodiment, the bicycle rear derailleur 10 may further include an adjustment component 500, a ring 600, an elastic component 700, and a clip 800.

Figure 3:
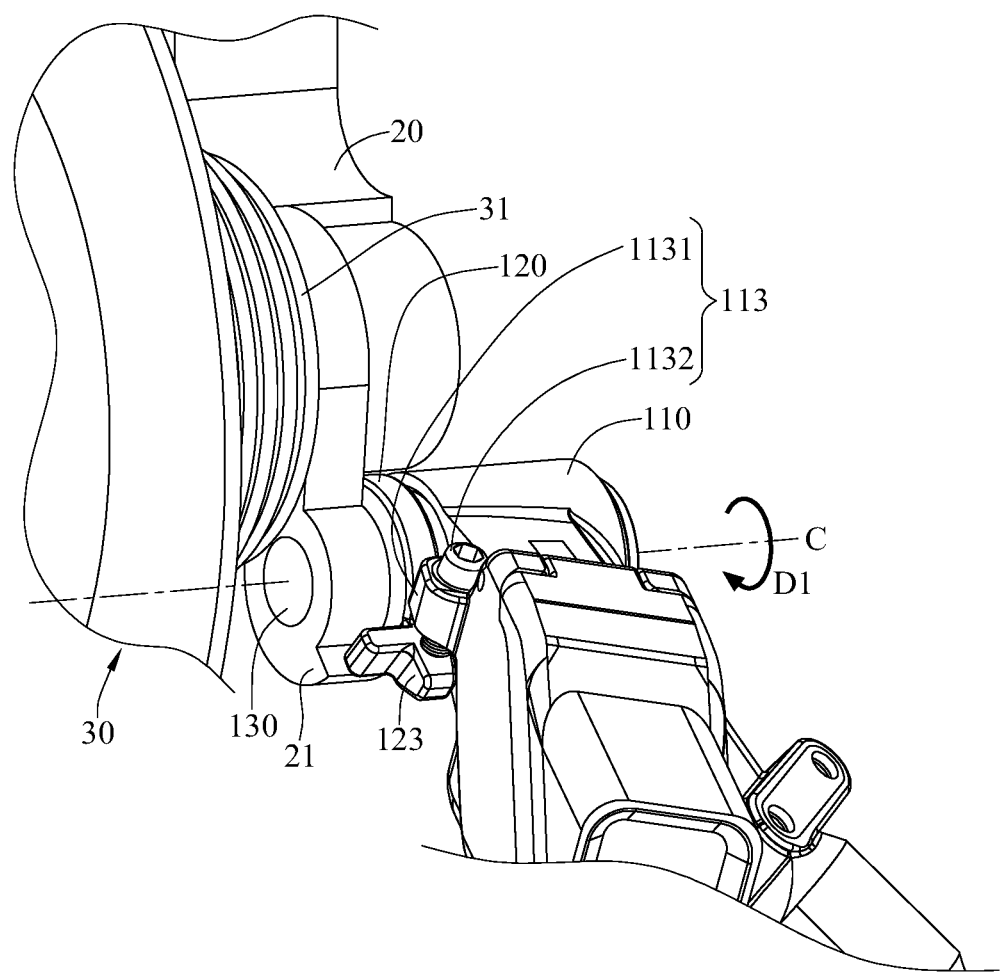
FIG. 3 is another partial perspective view of the bicycle rear derailleur, the bicycle frame, and the cassette in FIG. 1.
Figure 4:
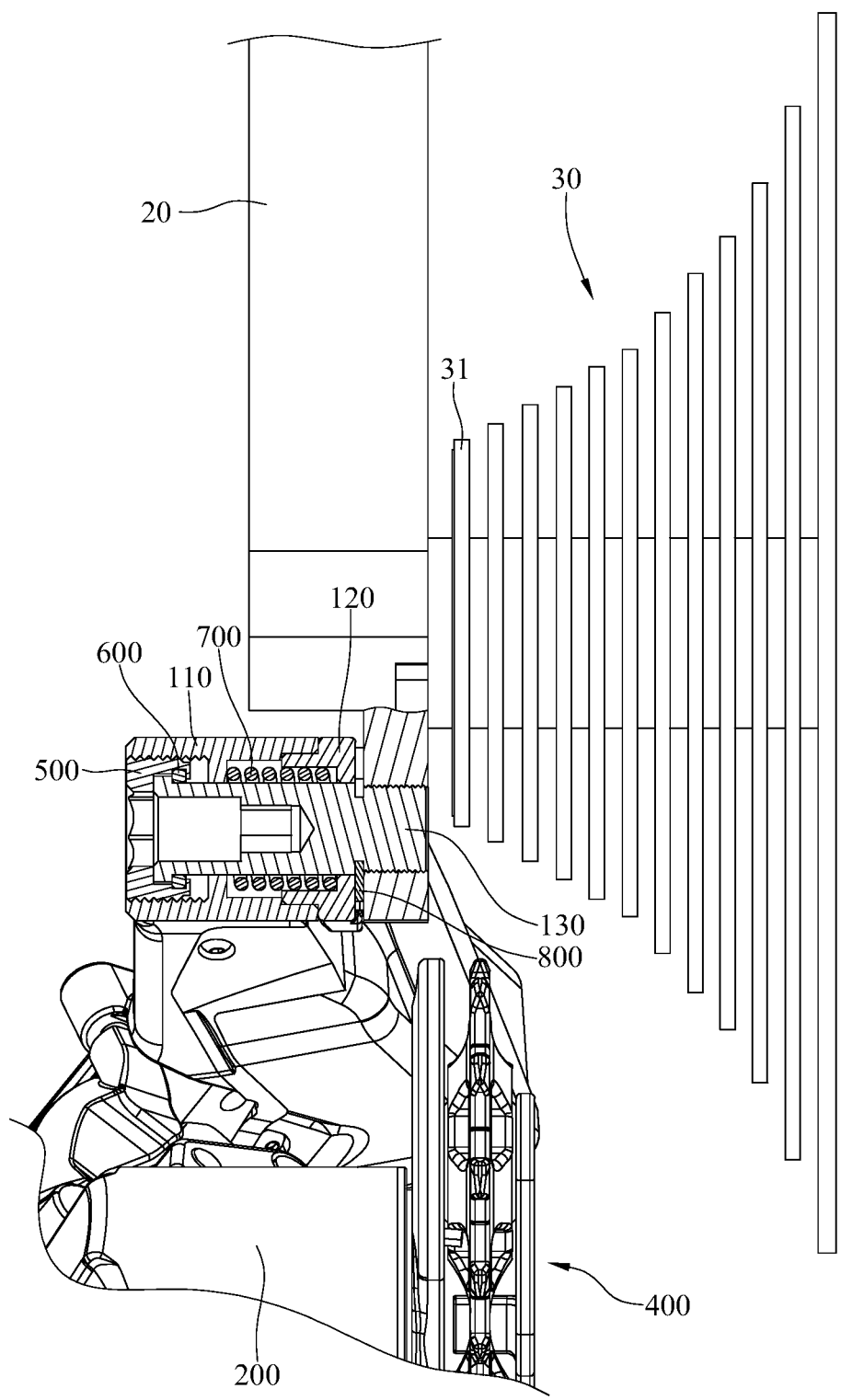
FIG. 4 is a partial cross-sectional view of the bicycle rear derailleur, the bicycle frame, and the cassette in FIG. 1.
Figure 5:
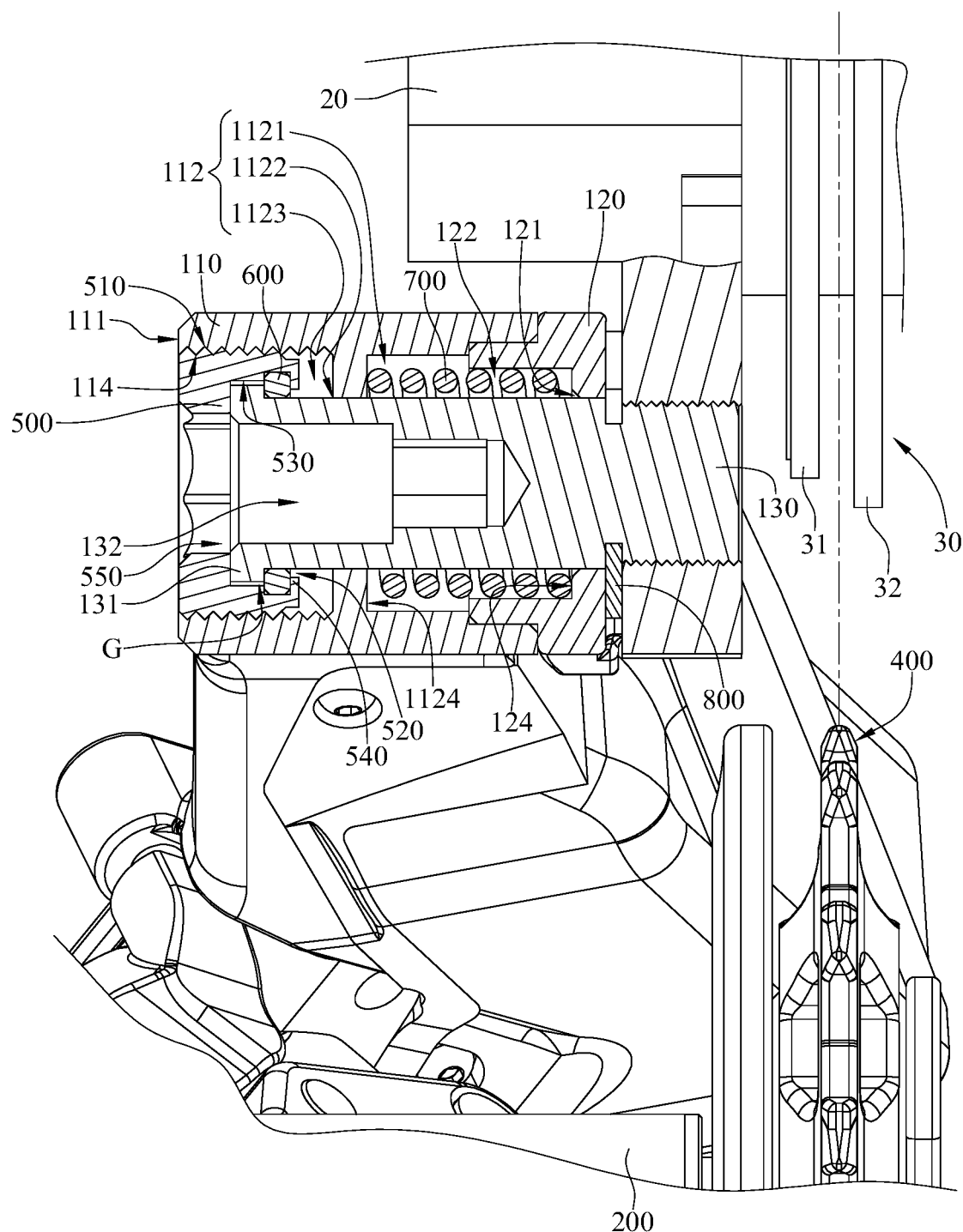
FIG. 5 is a partial and enlarged cross-sectional view of the bicycle rear derailleur, the bicycle frame, and the cassette in FIG. 4.

Referring to FIGS. 3 to 5, there are shown another partial perspective view, a partial cross-sectional view, and a partial and enlarged cross-sectional view of the bicycle rear derailleur 10.

The seat assembly 100 includes a first seat body 110, a second seat body 120, and a shaft 130. The first seat body 110 has an outer surface 111 and a through hole 112 formed at the outer surface 111. The second seat body 120 has an opening 121. The shaft 130 is disposed through the through hole 112 of the first seat body 110 and the opening 121 of the second seat body 120. An end of the shaft 130 is configured to be screwed into the bicycle frame 20 so as to mount the first seat body 110 and the second seat body 120 to the bicycle frame 20. As shown, the second seat body 120 is partially located between the bicycle frame 20 and the first seat body 110 so as to connect the first seat body 110 with the bicycle frame 20.

The second seat body 120 has a contact portion 123, and the bicycle frame 20 has a contact portion 21. The contact portion 123 of the second seat body 120 is configured to contact the contact portion 21 of the bicycle frame 20. The first seat body 110 has an adjustment part 113, and the adjustment part 113 of the first seat body 110 has a screw hole 1131 and a screw 1132 mating the screw hole 1131. The screw 1132 can be screwed into the screw hole 1131 and to make the distal end of the threaded part thereof stick out of the screw hole 1131 and contact the contact portion 123 of the second seat body 120. It is understood that the length of the protruding part of the screw 1132 out of the screw hole 1131 is adjustable by rotating the screw 1132. Thus, while the screw 1132 is being rotated, the movement of the screw 1132 forces the first seat body 110 to rotate about the shaft 130 (e.g., the arrow D1 shown in FIG. 3 or another direction opposite to the arrow D1), thereby adjusting the position of the first seat body 110. It is also understood that the screw 1132 being in contact with the second seat body 120 prevents the first seat body 110 from moving in the direction D1 when the screw 1132 is static.

The through hole 112 of the first seat body 110 has a first wide portion 1121, a narrow portion 1122, and a second wide portion 1123. The narrow portion 1122 is located between and connected to the first wide portion 1121 and the second wide portion 1123, and the first wide portion 1121 is located closer to the second seat body 120 than the second wide portion 1123. The second seat body 120 has an accommodation hole 122 connected to the opening 121, and the accommodation hole 122 is connected to the first wide portion 1121 of the through hole 112. Different portions of the shaft 130 are respectively located at the second wide portion 1123, the narrow portion 1122, the first wide portion 1121, the accommodation hole 122, and the opening 121.

The adjustment component 500 is located in the second wide portion 1123 of the through hole 112 and rotatably sleeved on another end of the shaft 130. In this embodiment, the first seat body 110 has an inner threaded portion 114 located in the second wide portion 1123 of the through hole 112, and the adjustment component 500 has an outer threaded portion 510. The outer threaded portion 510 of the adjustment component 500 is engaged with the inner threaded portion 114 of the first seat body 110.

In this embodiment, the shaft 130 has a flange 131, and the adjustment component 500 has a recess 520, an annular inner surface 530, and a protrusion 540. The annular inner surface 530 forms the recess 520, and the protrusion 540 protrudes from the annular inner surface 530. The flange 131 of the shaft 130 is located in the recess 520. The ring 600 is sleeved on the shaft 130 and located between the flange 131 of the shaft 130 and the protrusion 540 of the adjustment component 500. In this embodiment, there is a gap G formed between the flange 131 of the shaft 130 and the annular inner surface 530 of the adjustment component 500 in a radial direction of the shaft 130. As such, during the rotation of the adjustment component 500, the annular inner surface 530 of the adjustment component 500 does not contact the flange 131 of the shaft 130, thereby facilitating the rotation of the adjustment component 500.

Then, referring to FIGS. 6 and 7, the installation of the shaft 130, the ring 600, and the adjustment component 500 are described below.

Figure 6:
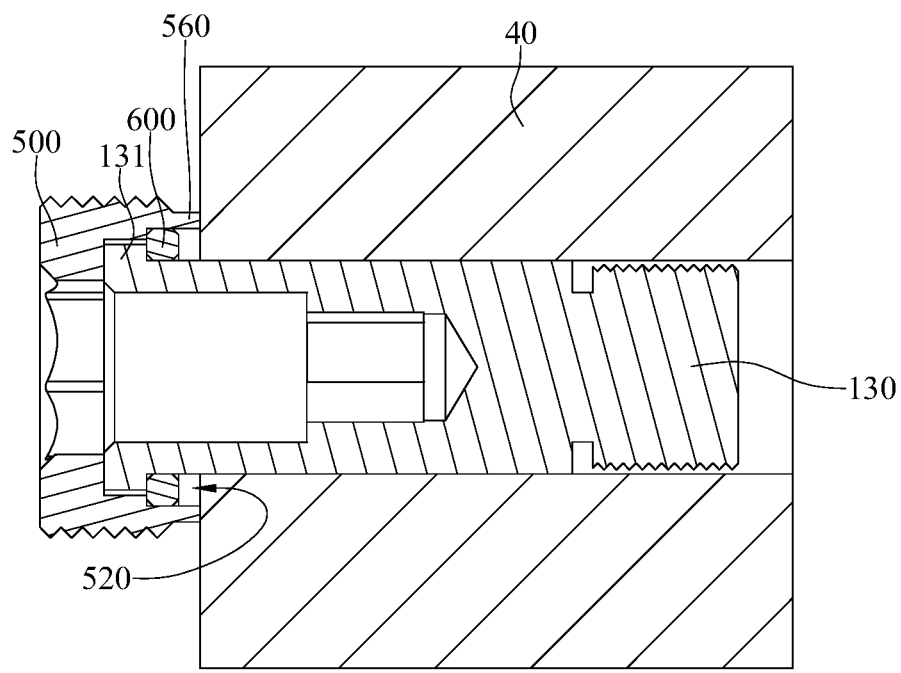
FIGS. 6 and 7 show an installation of a shaft, a ring, and an adjustment component of the bicycle rear derailleur in FIG. 4.
Figure 7:
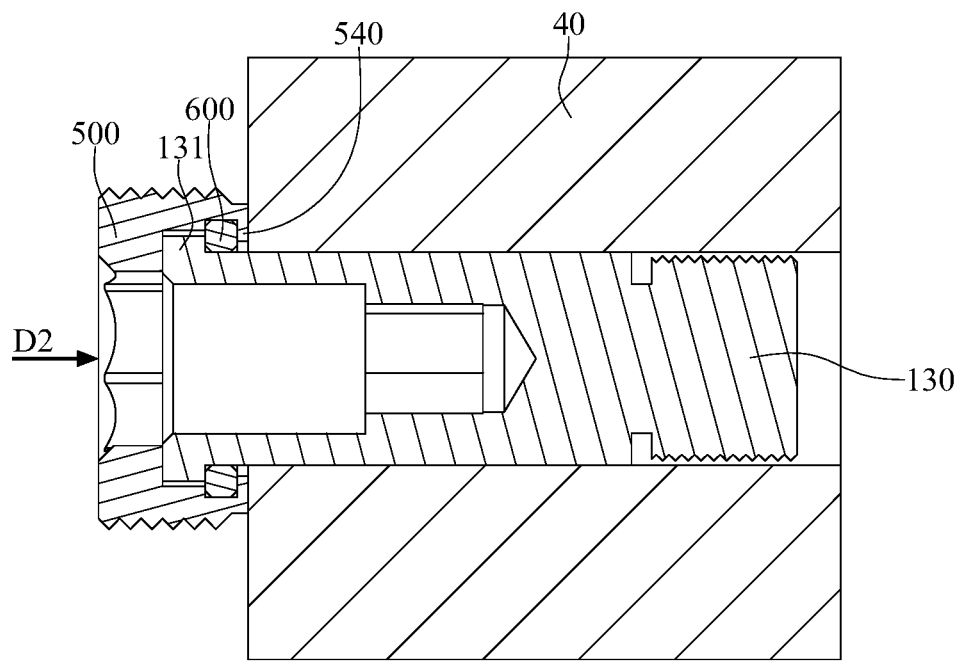

As shown in FIG. 6, firstly, the ring 600 is sleeved on the shaft 130 and contact the flange 131 of the shaft 130, then, the adjustment component 500 is sleeved on the shaft 130 so as to place the flange 131 of the shaft 130 into the recess 520 of the adjustment component 500. Then, the shaft 130 is inserted into a holder 40 to a position that a side wall 560 of the adjustment component 500 surrounding the recess 520 is in contact with the holder 40. Then, as shown in FIG. 7, a certain force is applied to the adjustment component 500 along a direction D2 to deform the side wall 560 of adjustment component 500, forming a protrusion 540 to cover the side of the ring 600 located away from the flange 131 of the shaft 130. By doing so, the ring 600 is located between and clamped by the protrusion 540 and the flange 131, thereby completing the assembly of the shaft 130, the ring 600, and the adjustment component 500. Then, the shaft 130 can be removed from the holder 40 and then to be inserted into the through hole 112 of the first seat body 110 and the opening 121 of the second seat body 120 and screwed into the bicycle frame 20, thereby achieving the installation of the first seat body 110 and the second seat body 120 on the bicycle frame 20.

In this embodiment, the ring 600 prevents the protrusion 540 from directly contacting the flange 131 of the shaft 130, but it is noted that the protrusion 540, the ring 600, and the flange 131 of the shaft 130 may have neglectable gaps (not shown) in the axial direction of the shaft 130 therebetween to ensure that the adjustment component 500 is rotatable.

In this embodiment, the adjustment component 500 further has an opening 550, and the shaft 130 further has an insertion hole 132. The insertion hole 132 of the shaft 130 is exposed from the opening 550 and the second wide portion 1123 of the through hole 112, allowing the insertion of a hand tool (e.g., hex key) into the insertion hole 132 of the shaft 130 to rotate the shaft 130 with respect to the bicycle frame 20. In addition, the adjustment component 500 can be rotated relative to the shaft 130 and the first seat body 110 by inserting and rotating a tool (e.g., hex key) that mates the opening 550 into the opening 550.

In this embodiment, the accommodation hole 122 of the second seat body 120 is wider than the opening 121, and there is a contact surface 124 formed between the accommodation hole 122 and the opening 121. Another contact surface 1124 is formed between the first wide portion 1121 and the narrow portion 1122 of the through hole 112 of the first seat body 110. The elastic component 700 is, for example, a compression spring. The elastic component 700 is sleeved on the shaft 130, different portions of the elastic component 700 are respectively located at the accommodation hole 122 of the second seat body 120 and the first wide portion 1121 of the through hole 112 of the first seat body 110. Two opposites ends of the elastic component 700 respectively press against the contact surfaces 124 and 1124. The clip 800 is fixed on the shaft 130 and located at a side of the second seat body 120 located away from the first seat body 110. The elastic component 700 forces the second seat body 120 to press against the clip 800. In addition, the elastic component 700 also forces the first seat body 110 to move away from the second seat body 120 to eliminate unwanted axial gaps between the inner threaded portion 114 of the first seat body 110 and the outer threaded portion 510 of the adjustment component 500.

As shown in FIG. 1, the linkage assembly 300 includes a first link 310 and a second link 320. Two opposite ends of the first link 310 are respectively and pivotably disposed on the first seat body 110 and the movable component 200, and two opposite ends of the second link 320 are respectively and pivotably disposed on the first seat body 110 and the movable component 200. The first seat body 110, the first link 310, the second link 320, and the movable component 200 together form a four-link mechanism. The chain guide 400 is pivotably disposed on the movable component 200.

Figure 8:
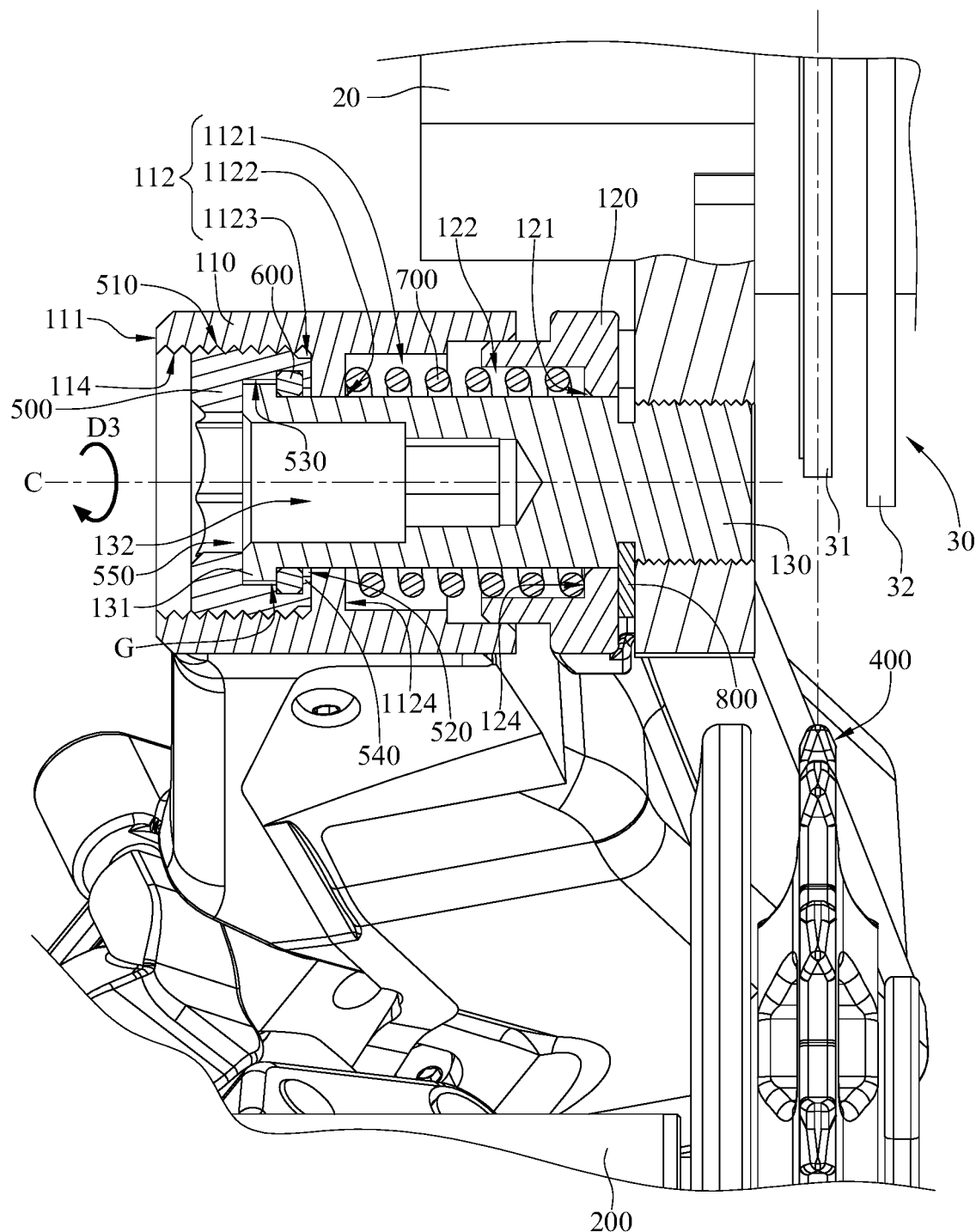
FIG. 8 shows a movement of a first seat body relative to the bicycle frame in FIG. 5.

Different bicycle frames may have a significant difference in thickness, and even physical damage sometimes will deform the bicycle frame. Regardless of the exact thickness of the bicycle frame or the deformation of the bicycle frame, the bicycle rear derailleur 10 is able to make its chain guide 400 align with the sprocket. For example, as shown in FIG. 5, when the bicycle rear derailleur 10 is just installed, the chain guide 400 may misalign with the sprockets of the cassette 30. As shown, without any adjustment of the chain guide 400, the chain guide 400 may point at no sprocket but the interval between two adjacent sprockets (e.g., the sprockets 31 and 32 of the cassette 30). To solve this problem, the position of the chain guide 400 can be adjusted by rotating the adjustment component 500. In detail, referring to FIG. 8, during the rotation of the adjustment component 500 (e.g., along a direction D3), the adjustment component 500 is prevented from moving along the central line C of the shaft 130 by the flange 131 of the shaft 130, such that the interaction between the outer threaded portion 510 and the inner threaded portion 114 of the first seat body 110 can cause the first seat body 110 to move away from the bicycle frame 20 and the second seat body 120 along the central line C of the shaft 130, thereby moving the movable component 200 and the chain guide 400 thereon to the desired position. By doing so, the chain guide 400 is allowed to move and align with the sprocket 31.

It is noted that the chain guide 400 is allowed to move towards the opposite direction by reversely rotating the adjustment component 500. In the case that the chain guide 400 points at the side of the sprocket 31 located away from the sprocket 32, the adjustment component 500 can be reversely rotated (i.e., along a direction opposite to the direction D3), such that the first seat body 110 is moved towards the second seat body 120 and the bicycle frame 20 along the central line C of the shaft 130 for aligning the chain guide 400 with the sprocket 31.

Accordingly, the position of the chain guide 400 is adjustable without detaching and reinstalling the bicycle rear derailleur 10 or the need of any additional gasket. Therefore, the bicycle rear derailleur 10 enables an effortless and convenient position adjustment of the chain guide 400. Also, the chain guide 400 is moved by rotating the adjustment component 500, thus the position of the chain guide 400 can be finely adjusted compared to the usage of the gasket, thus the bicycle rear derailleur 10 is able to achieve a high accuracy alignment of the chain guide 400 with the sprocket 31 of the cassette 30.

On the other hand, during the rotation of the adjustment component 500 to adjust the position of the first seat body 110, the movable component 200 is moved along a path parallel to the central line C of the shaft 130. Therefore, a maintainer is allowed to easily observe the movement of the chain guide 400 for ensuring the chain guide 400 to be accurately aligned with the sprocket 31.

In the case that the bicycle rear derailleur 10 is an electronic derailleur, the position of the chain guide 400 can be adjusted by the rotation of the adjustment component 500 instead of the electric control manner. Therefore, the controller of the bicycle rear derailleur 10 is not required to record multiple predetermined position of the chain guide 400 in its data storage space, thereby saving its data storage space.

Further, during the adjustment of the position of the chain guide 400, the tool that used to rotate the adjustment component 500 can be operated by one hand. As such, the other hand is free to rotate the bicycle pedal so as to move the bicycle chain, allowing the user to generate sound by the chain to determine whether the chain guide 400 reaches the correct position. Therefore, the adjustment of the chain guide 400 can be done by one person.

In this embodiment, the screw 1132 is in contact with the contact portion 123 of the second seat body 120, and the contact portion 123 of the second seat body 120 is in contact with the contact portion 21 of the bicycle frame 20, such that the rotation of the adjustment component 500 along the direction opposite to the direction D3 will not cause the first seat body 110 to rotate along the direction D1. On the other hand, when the bicycle chain is hung on the chain guide 400 and the sprocket 31, the bicycle chain limits the movement of the chain guide 400 along the direction D3, such that the rotation of the adjustment component 500 along the direction D3 will not cause the first seat body 110 to rotate along a direction opposite to the direction D1. Therefore, no matter which direction (e.g., the direction D3 or the direction opposite to the direction D3) the adjustment component 500 rotate, the first seat body 110 is ensured to be moved along the central line C of the shaft 130 instead of being rotated about the central line C of the shaft 130.

Figure 9:
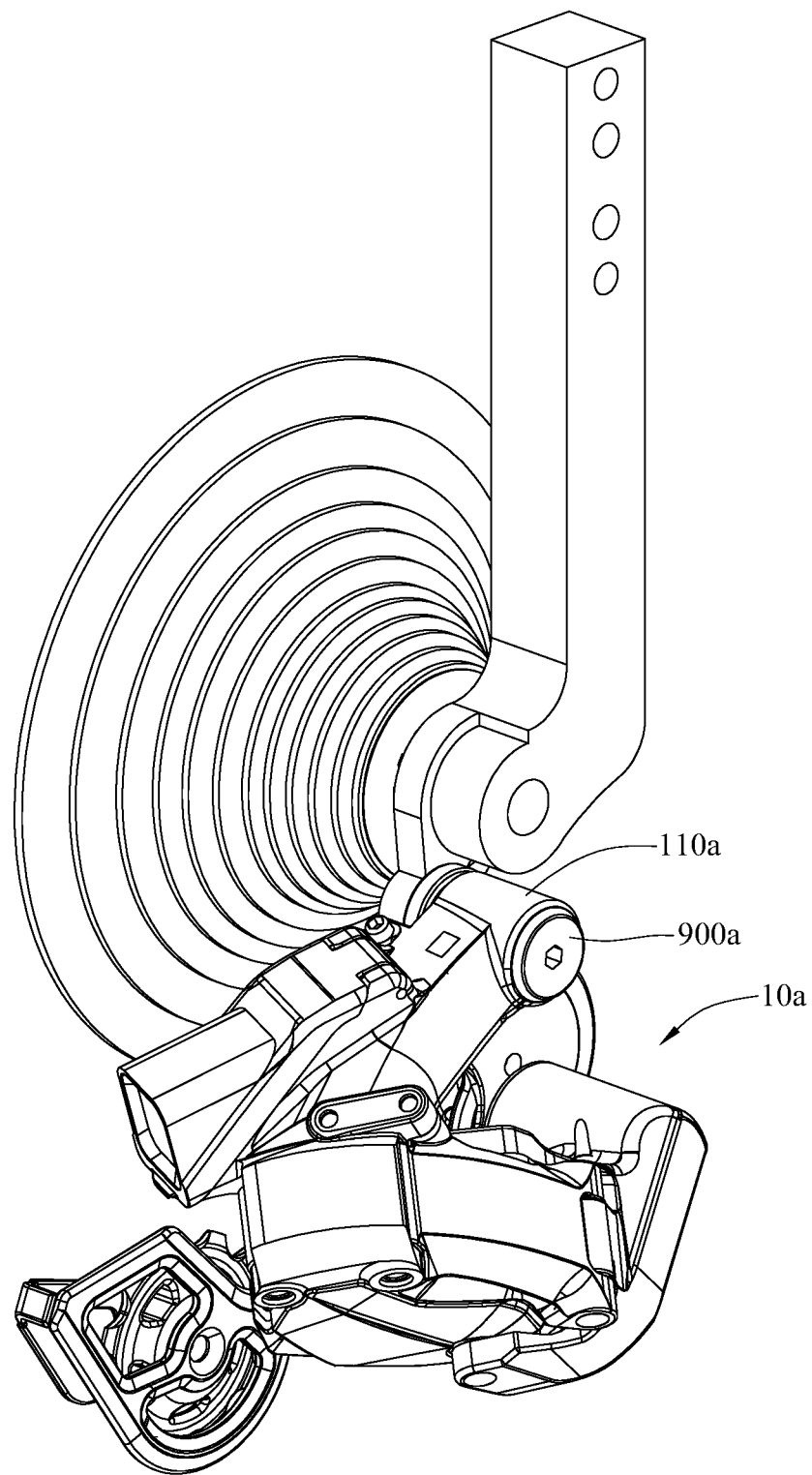
FIG. 9 is a perspective view of a bicycle rear derailleur according to a second embodiment of the disclosure, a bicycle frame, and a cassette.
Figure 10:
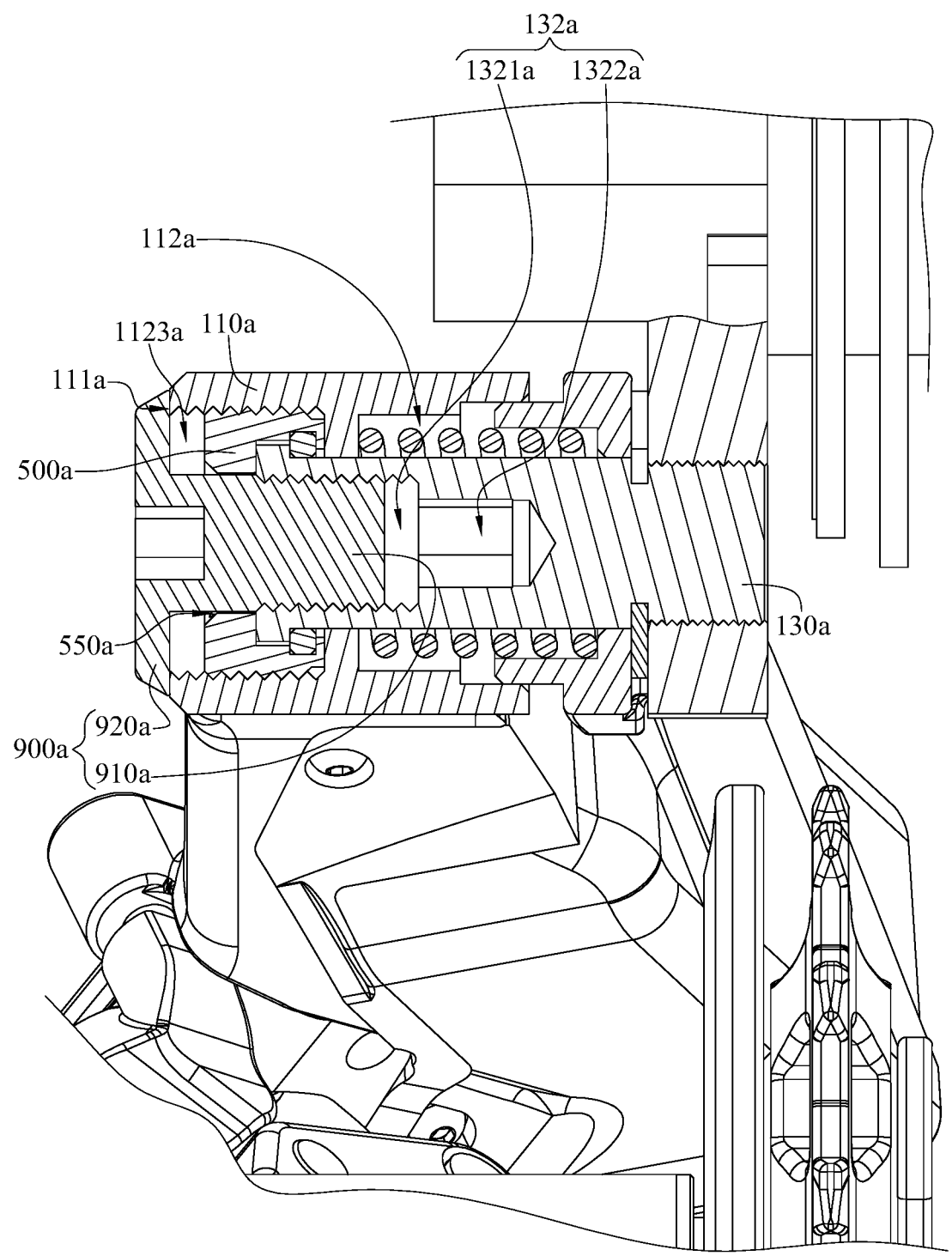
FIG. 10 is a partial cross-sectional view of the bicycle rear derailleur, the bicycle frame, and the cassette in FIG. 9.

Then, referring to FIGS. 9 and 10, there are respectively shown a perspective view and a partial cross-sectional view of a bicycle rear derailleur 10*a* according to a second embodiment of the disclosure, a bicycle frame, and a cassette.

In this embodiment, the bicycle rear derailleur 10*a* further includes a resistance applying component 900*a*, and an insertion hole 132*a* of a shaft 130*a* further has a mount portion 1321*a* and an extension portion 1322*a*. The mount portion 1321*a* is located between and connected to the extension portion 1322*a* and an opening 550*a* of an adjustment component 500*a*. The resistance applying component 900*a* includes a pillar portion 910*a* and a flange portion 920*a*. The flange portion 920*a* radially protrudes from the pillar portion 910*a*. The pillar portion 910*a* is inserted into a second wide portion 1123*a* of a through hole 112*a* of a first seat body 110*a*, the opening 550*a* of the adjustment component 500*a*, and the mount portion 1321*a* of the insertion hole 132*a*, and the pillar portion 910*a* is fixed to the shaft 130*a*, for example, via an inner threaded portion in the mount portion 1321*a* and an outer threaded portion of the pillar portion 910*a*. The flange portion 920*a* of the resistance applying component 900*a* is in contact with an outer surface 111*a* of the first seat body 110*a* so as to provide the friction to the first seat body 110*a* to prevent it from being rotated along the direction D1 (as shown in FIG. 3) or the direction opposite to the direction D1.

According to the bicycle rear derailleur as discussed in the above embodiments, the first seat body is movable towards or away from the second seat body or the bicycle frame along the central line of the shaft, such that the position of the first seat body and the chain guide thereon can be adjusted. Therefore, the chain guide can be moved to align with the sprocket without detaching the bicycle rear derailleur or the need of any gasket. Accordingly, the bicycle rear derailleur achieves an effortless and convenient position adjustment of chain guide.

In addition, the position of the chain guide can be finely adjusted by moving the first seat body towards or away from the second seat body or the bicycle frame along the central line of the shaft, thus the bicycle rear derailleur is able to achieve a high accuracy alignment of the chain guide with the sprocket of the cassette.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle rear derailleur, configured to be mounted on a bicycle frame, comprising:
    a seat assembly, comprising a first seat body, a second seat body, and a shaft, wherein the shaft is disposed through the first seat body and the second seat body and configured to be mounted on the bicycle frame, and the second seat body is configured to connect the first seat body with the bicycle frame;
    an adjustment component, rotatably sleeved on the shaft;
    a movable component;
    a linkage assembly, connecting the movable component with the first seat body; and
    a chain guide, pivotably disposed on the movable component;
    wherein the adjustment component is rotatable relative to the shaft and the first seat body to move the first seat body towards or away from the second seat body along a central line of the shaft.

2. The bicycle rear derailleur according to claim 1, wherein the first seat body has a through hole and an inner threaded portion located in the through hole, the shaft is partially located in the through hole, the adjustment component has an outer threaded portion, the outer threaded portion of the adjustment component is engaged with the inner threaded portion of the first seat body.

3. The bicycle rear derailleur according to claim 2, further comprising a ring, wherein the shaft has a flange, the adjustment component has a recess, an annular inner surface, and a protrusion, the annular inner surface forms the recess, the protrusion protrudes from the annular inner surface, the flange of the shaft is located in the recess, and the ring is sleeved on the shaft and located between the flange of the shaft and the protrusion of the adjustment component.

4. The bicycle rear derailleur according to claim 3, wherein there is a gap formed between the flange and the annular inner surface of the adjustment component.

5. The bicycle rear derailleur according to claim 2, wherein the second seat body has a contact portion, the contact portion is configured to be in contact with the bicycle frame, the first seat body has an adjustment part, and the adjustment part is in contact with the contact portion so as to limit a pivoting movement of the first seat body along a direction.

6. The bicycle rear derailleur according to claim 5, wherein the adjustment part has a screw hole and a screw, the screw is screwed into the screw hole, and the screw has an end in contact with the contact portion.

7. The bicycle rear derailleur according to claim 2, further comprising an elastic component, wherein two opposite ends of the elastic component are respectively in contact with the first seat body and the second seat body, and the elastic component is configured to force the first seat body to move away from the second seat body.

8. The bicycle rear derailleur according to claim 7, wherein the through hole has a first wide portion, a narrow portion, and a second wide portion, the narrow portion is located between and connected to the first wide portion and the second wide portion, the first wide portion is located closer to the second seat body than the second wide portion, the inner threaded portion of the first seat body is located in the second wide portion, the adjustment component is located in the second wide portion, the second seat body has an accommodation hole, the accommodation hole is connected to the first wide portion, different portions of the shaft are respectively located at the first wide portion, the narrow portion, the second wide portion, and the accommodation hole, and different portions of the elastic component are respectively located at the first wide portion and the accommodation hole.

9. The bicycle rear derailleur according to claim 7, further comprising a clip, wherein the clip is fixed on the shaft and located at a side of the second seat body located away from the first seat body.

10. The bicycle rear derailleur according to claim 2, wherein the first seat body has an outer surface, the through hole is formed at the outer surface, the adjustment component has an opening, the shaft has an insertion hole, and the insertion hole is exposed from the opening and the through hole.

11. The bicycle rear derailleur according to claim 2, further comprising a resistance applying component, wherein the first seat body has an outer surface, the through hole is formed at the outer surface, the adjustment component has an opening connected to the through hole, the shaft has an insertion hole, the insertion hole has a mount portion and an extension portion, the mount portion is located between and connected to the extension portion and the opening, the resistance applying component comprises a pillar portion and a flange portion, the flange portion radially protrudes from the pillar portion, the pillar portion is inserted into the through hole, the opening, and the mount portion of the insertion hole, and the flange portion is in contact with the outer surface.

12. The bicycle rear derailleur according to claim 1, wherein the first seat body is movable along the central line of the shaft to move the movable component along a path parallel to the central line of the shaft.

13. The bicycle rear derailleur according to claim 1, wherein the adjustment component is not movable along the central line of the shaft.

14. The bicycle rear derailleur according to claim 1, wherein the adjustment component is positioned by a flange of the shaft so as not to be movable along the central line of the shaft.

15. A bicycle rear derailleur, configured to be mounted on a bicycle frame, comprising:
   a seat assembly, comprising a first seat body and a shaft, wherein the shaft is disposed through the first seat body and configured to be mounted on the bicycle frame;
   an adjustment component, disposed on the first seat body and rotatably sleeved on the shaft, wherein the adjustment component is rotatable relative to the first seat body to move the first seat body relative to the shaft along a central line of the shaft;
   a movable component;
   a linkage assembly, connecting the movable component with the first seat body; and
   a chain guide, pivotably disposed on the movable component.

16. The bicycle rear derailleur according to claim 15, wherein when the first seat body is moved relative to the shaft along the central line of the shaft, the movable component is moved along a path parallel to the central line of the shaft.

17. The bicycle rear derailleur according to claim 15, wherein the adjustment component is positioned by a flange of the shaft so as not to be movable along the central line of the shaft.

18. A bicycle rear derailleur, configured to be mounted a bicycle frame, comprising:
   a seat assembly, comprising a first seat body and a shaft, wherein the shaft is disposed through the first seat body and configured to be mounted on the bicycle frame;
   an adjustment component, disposed on the first seat body and rotatably sleeved on the shaft, wherein the adjustment component is rotatable relative to the first seat body to move the first seat body towards or away from the bicycle frame along a central line of the shaft;
   a movable component;
   a linkage assembly, connecting the movable component with the first seat body; and
   a chain guide, pivotably disposed on the movable component.

19. The bicycle rear derailleur according to claim 18, wherein when the first seat body is moved relative to the shaft along the central line of the shaft, the movable component is moved along a path parallel to the central line of the shaft.

20. The bicycle rear derailleur according to claim 18, wherein the adjustment component is positioned by a flange of the shaft so as not to be movable along the central line of the shaft.

* * * * *